(12) United States Patent
Stein et al.

(10) Patent No.: US 10,293,726 B2
(45) Date of Patent: May 21, 2019

(54) DEVICE FOR MOUNTING A HEADREST IN A SEAT STRUCTURE OF A VEHICLE SEAT

(71) Applicant: GM GLOBAL TECHNOLOGY OPERATIONS LLC, Detroit, MI (US)

(72) Inventors: Martin Stein, Ruesselsheim (DE); Juergen Maier, Ruesselsheim (DE); Andreas Meinel, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 165 days.

(21) Appl. No.: 15/383,865

(22) Filed: Dec. 19, 2016

(65) Prior Publication Data

US 2017/0174106 A1    Jun. 22, 2017

(30) Foreign Application Priority Data

Dec. 19, 2015  (DE) .................... 10 2015 016 655

(51) Int. Cl.
| | | |
|---|---|---|
| *A47C 1/10* | (2006.01) | |
| *B60N 2/80* | (2018.01) | |
| *B60N 2/809* | (2018.01) | |
| *B60N 2/897* | (2018.01) | |
| *B60N 2/68* | (2006.01) | |

(52) U.S. Cl.
CPC ............. *B60N 2/80* (2018.02); *B60N 2/68* (2013.01); *B60N 2/809* (2018.02); *B60N 2/897* (2018.02)

(58) Field of Classification Search
CPC ........ B60N 2/806; B60N 2/809; B60N 2/897; B60N 2/80; B60N 2/803; B60N 2/882; B60N 2/90; B60N 2/847; B60N 2/838

USPC ........ 297/391, 410, 452.18, 463.1, 399, 400
See application file for complete search history.

(56) References Cited

U.S. PATENT DOCUMENTS

| | | | | |
|---|---|---|---|---|
| 5,397,170 A | * | 3/1995 | Shrock ............ | B60N 2/809 297/452.18 |
| 5,895,094 A | * | 4/1999 | Mori .............. | B60N 2/818 297/410 |
| 7,080,886 B2 | * | 7/2006 | Bauer ............. | A47C 7/38 297/409 |
| 7,318,626 B2 | * | 1/2008 | Ohchi ............ | B60N 2/682 297/410 |
| 7,661,758 B1 | | 2/2010 | Veine et al. | |

(Continued)

FOREIGN PATENT DOCUMENTS

| | | |
|---|---|---|
| DE | 102008026815 A1 | 12/2009 |
| DE | 102008038850 A1 | 2/2010 |
| DE | 102013005246 A1 | 10/2014 |

OTHER PUBLICATIONS

German Patent Office, German Search Report for German Application No. 102015016655.7, dated Aug. 4, 2016.

*Primary Examiner* — Chi Q Nguyen
(74) *Attorney, Agent, or Firm* — Lorenz & Kopf, LLP

(57) ABSTRACT

A device for mounting a headrest in a seat structure of a vehicle seat, in particular a vehicle seat of an automobile. The device includes a connecting part formed from a plate and a tubular receiving element for a retaining rod of a headrest. The receiving element is connected to a bearing section of the connecting part. The connecting part includes a supporting section configured at an angle to the bearing section. The supporting section contacts a seat structure of a vehicle seat in the vehicle height direction.

15 Claims, 2 Drawing Sheets

(56) References Cited

U.S. PATENT DOCUMENTS

| | | | |
|---|---|---|---|
| 8,672,399 B2* | 3/2014 | Brunner | B60N 2/3011 297/61 |
| 8,794,705 B2 | 8/2014 | Steinmetz et al. | |
| 9,145,077 B2* | 9/2015 | Bagin | B60N 2/4802 |
| 9,403,456 B2 | 8/2016 | Ozaki | |
| 2007/0035163 A1* | 2/2007 | Andrews | B60N 2/888 297/216.12 |
| 2008/0001456 A1* | 1/2008 | Muller | B60N 2/20 297/354.1 |
| 2008/0129092 A1* | 6/2008 | Omori | B60N 2/4885 297/216.1 |
| 2009/0179476 A1* | 7/2009 | Brunner | B60N 2/874 297/410 |
| 2010/0007183 A1* | 1/2010 | Akutsu | B60N 2/7094 297/216.12 |
| 2012/0025583 A1 | 2/2012 | Yamada | |
| 2014/0252839 A1* | 9/2014 | Fleischheuer | B60N 2/80 297/463.1 |
| 2015/0042142 A1 | 2/2015 | Hesterberg et al. | |
| 2015/0091356 A1* | 4/2015 | Ozaki | B60N 2/803 297/391 |

* cited by examiner

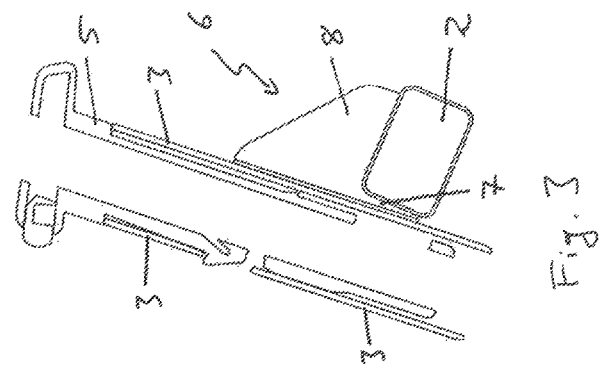
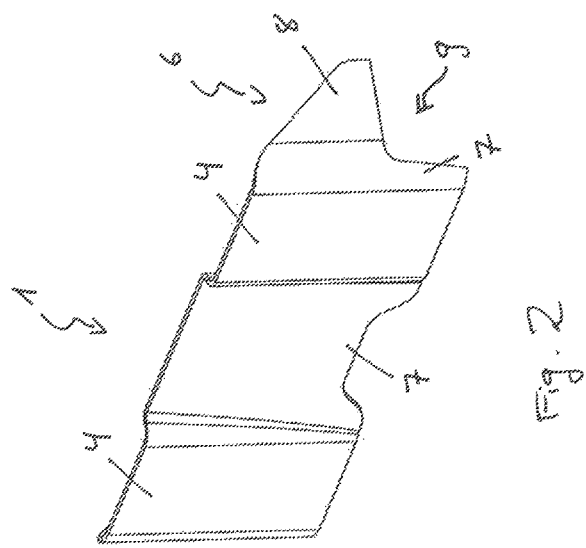
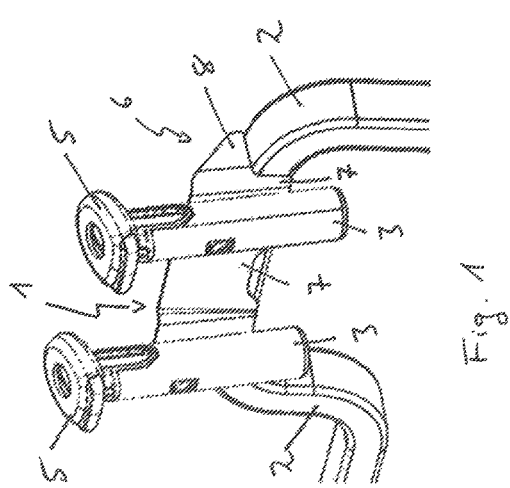
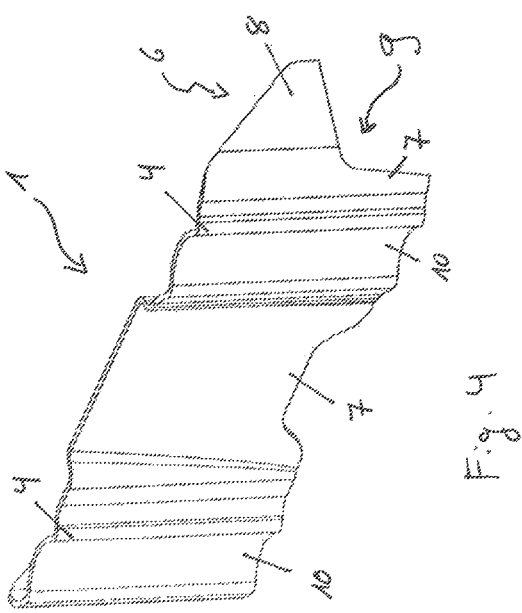

DEVICE FOR MOUNTING A HEADREST IN A SEAT STRUCTURE OF A VEHICLE SEAT

CROSS-REFERENCE TO RELATED APPLICATION

This application claims priority to German Patent Application No. 102015016655.7, filed Dec. 19, 2015, which is incorporated herein by reference in its entirety.

TECHNICAL FIELD

The present disclosure pertains to a device for mounting a headrest in a seat structure of a vehicle seat, for example a vehicle seat of an automobile.

BACKGROUND

Seating assemblies of motor vehicles, for example automobiles, typically have headrests. The headrests have retaining rods for mounting in a seat structure of a vehicle seat, which can be inserted in corresponding receptacles. The receptacles are connected to the seat structure of the vehicle seat. The receptacles for the retaining rods of the headrests are typically tubular and the retaining rods can be inserted into these tubular receptacles. The receptacles specify the angular position of the headrest relative to the seating assembly. Because of the differences in the sitting positions on different seating assemblies, for example between an outside place and a central place of the second row of seats, it is necessary to arrange the tubular receptacles in different angular positions on the seat structure.

DE 10 2011 112 418 A1 discloses a connecting element for fixing a headrest to a seat of a vehicle. A receiving sleeve contacts a connecting element in a connecting section. During a displacement of the connecting element along the connecting section, the angle of the connecting element with respect to the receiving sleeve changes. Following the displacement and the associated adjustment of the angle, the receiving sleeve and the connecting element are preferably welded to one another.

SUMMARY

In accordance with the present disclosure to provide a device for mounting a headrest in a seat structure of a vehicle seat. The device specifies the angular position of the headrest, in particular the retaining rod for the headrest. The angular positions can be adapted to the seat position in a simple manner. In the device according to the present disclosure, it is provided that this includes a connecting part formed from a plate and a tubular receiving element for a retaining rod of a headrest. The receiving element is connected to a bearing section of the connecting part. The connecting part includes a supporting section configured at an angle to the bearing section. The supporting section contacts a seat structure of a vehicle seat in the vehicle height direction. The tubular receiving element can be differently designed and for example have a rectangular, circular, oval or other cross-sections.

The supporting section of the device ensures on the one hand that forces acting from outside on the headrest and therefore on the tubular receiving elements and the connecting part are diverted via the supporting section to the seat structure. On the other hand, because of the contact of supporting section and seat structure and the connection of the receiving element to the bearing section, the angular position of the receiving element relative to the seat structure and therefore the seat position on the vehicle seat is fixed.

According to the present disclosure, it is provided that the connecting part is formed from a plate. The connecting part is configured to be one-part. The supporting section can then be produced in a simple manner by a bending method. The angular position of the bearing section and therefore the angular position of the receiving element can as a result be adapted in a simple manner by variation of the supporting section, in particular in the region of the supporting section which contacts the seat structure. For example, this can be accomplished by a trimming change of the supporting section. When producing the supporting section by a bending process, the trimming change of the supporting section preferably takes place before the bending process, during the production of a flat sheet-metal pattern of the connecting part, for example, by a stamping process or cutting process. It is completely feasible that the trimming change also takes place following a bending process. The aforesaid processes involve usual processes such as are used in the processing of plate-shaped components so that it is possible to produce the connecting part formed from a plate in a cost-effective manner.

The simple design of the connecting part with a bearing section for the receiving element and a supporting section which contacts the seat structure in the vehicle height direction and thus specifies the angular position of the tubular connecting elements. The connecting part is formed from a plate, enables various angular positions of the head supports to be achieved with otherwise identical components by a trimming change. In this case, it is completely feasible to adapt initially identically configured connecting parts to the required angular position by a subsequent trimming change. Since only the trimming of the connecting part needs to be adapted, it is thus ensured that approximately identical connecting parts can be used for different angular positions, which leads to a more cost-effective production of the connecting parts and to a cost saving during assembly of the device.

In a particularly preferred embodiment it is provided that the connecting part has a contact section. The contact section contacts the seat structure in the vehicle longitudinal direction. The contact section on the one hand facilitates the alignment of the device, in particular the alignment of the connecting part in the vehicle longitudinal direction and additionally serves to transmit forces which occur in the vehicle longitudinal direction from the headrest to the seat structure. Preferably the connection of connecting part and seat structure is made inter alia in the region of the contact section. In particular, it is provided that the contact section is connected to the seat structure by a weld connection. It is feasible that the connecting section has a plurality of contact sections.

It is expedient if the contact section and the bearing section are configured at an angle to one another. Accordingly in such an embodiment the contact section and the supporting section form a receptacle for a partial region of the seat structure. The angled design of the contact section to the bearing section ensures that the bearing section is arranged at a distance from the seat structure. In particular, the distance of the bearing section from the seat structure is determined by the extension of the contact section in the vehicle longitudinal direction. The distance of the bearing section and therefore the receiving elements for the retaining rods of the head support can thus be adapted individually to the seat structure by varying the longitudinal extension of the contact section.

It is particularly advantageous if the contact section is formed by a recess of the supporting section. As a result, contact section and supporting section lie in the same plane and the contact section can be produced in a simple manner by a stamping and subsequent bending process. Furthermore, contact section and supporting section can be adapted in a simple manner to the required angular position by changing the trimming of the recess. Since the contact section contacts the seat structure in the vehicle longitudinal direction and the supporting section contacts the seat structure in the vehicle height direction, the angular position of the bearing section and thus of the receiving element to the seat structure is fixed.

According to a particularly preferred embodiment, it is therefore provided that the contact section and the supporting section enclose an angle between 60° and 105°, in particular an angle between 75° and 90°, in the vehicle transverse direction.

It is particularly advantageous if at least a partial region of the seat structure abuts positively against the contact section and/or against the supporting section. This ensures a particularly stable connection between seat structure and contact section and/or seat structure and supporting section.

Typically retaining rods of the headrest are mounted adjustably in receptacles. The retaining rods are manually displaceable and engage in previously specified positions in relation to the receiving elements. In a particularly preferred embodiment of the present disclosure it is provided that the receiving element receives a sleeve for receiving the retaining rod, in particular for inserting the retaining rod. The sleeve is mounted in a fixed position in the receiving element.

The sleeve arranged in the retaining element is preferably configured in such a manner that the retaining rod can be inserted into this. For the purpose of height adjustment of the head rest, it is expedient if the retaining rod is arranged axially displaceable in the sleeve. Preferably the sleeve has a latching element which cooperates with a recess of the retaining rod in such a manner that the latching element engages in the recess and the retaining rods are held in the positions specified by the recess in the axial direction. Preferably the retaining rod has a plurality of recesses spaced apart in the axial direction, whereby a height adjustment of the headrest is possible in positions specified by the recesses. The latching element prevents an unintentional height adjustment of the headrest during cooperation with the recess.

Preferably the bearing section is formed as a flat surface on the side facing the receiving element. However, it is also feasible that the bearing section has a recess corresponding to the shape of the receiving element on the side facing the receiving element. This recess on the one hand increases the stability of the connection between bearing section and receiving element and on the other hand facilitates the positioning of the receiving element on the corresponding bearing section during assembly.

Preferably the connecting part is formed in one piece, from a metal plate, made of steel. As a result, the connecting part can easily be produced by a stamping and subsequent bending process. In particular, a flat sheet metal pattern can be initially stamped out from a metal sheet and then the connecting part can be formed by a bending process. As a result, the connecting part can be manufactured particularly simply and cost-effectively. The trimming change for adaptation of the angular position of the bearing section to the seat structure can then be accomplished directly during the stamping process, following the stamping process and before the bending process, or following the bending process.

According to a preferred further development of the present disclosure, it is provided that the connecting part has two bearing sections. In such an embodiment, the connecting part is used to receive two receiving elements. In particular, it is provided that the two receiving elements are arranged parallel and spaced apart in the vehicle transverse direction and are used to receive two retaining rods of the same headrest.

It is particularly advantageous if the supporting section has at least one supporting leg. Such a supporting leg can be produced, for example, by a bending process from a flat sheet-metal pattern of the connecting part. In a preferred embodiment, the supporting leg is formed in a region of the connecting part adjacent to the bearing section. Preferably the supporting section has a plurality of supporting legs, in particular two supporting legs. In a preferred embodiment, the bearing section is formed between the two supporting legs.

According to an advantageous embodiment of the present disclosure, it is provided that the supporting section has a stiffening region, wherein the stiffening region connects two supporting legs to one another. Preferably the stiffening region is formed in the region of the supporting leg facing away from the receiving element. It is completely feasible that the supporting section also contacts the seat structure, particularly the stiffening region is connected to the seat structure.

It is feasible that two supporting legs and a bearing section form a U-shaped angled partial region of the connecting part. This ensures a particularly high stability of the device, particularly of the connecting part, against forces acting from outside on the headrest. It is expedient if the connecting part is connected to the receiving element by a weld connection and/or the connecting part is connected to the seat structure by a weld connection. This ensures a stable connection between seat structure and connecting part as well as connecting part and receiving element.

In an advantageous further development of the present disclosure it is provided that the receiving element and/or the sleeve has a means which cooperates with a counter means of the retaining rod in such a manner that receiving of a retaining rod not corresponding to the receiving element and/or the sleeve is prevented. In a vehicle having a plurality of headrests, this prevents the headrests from being exchanged, for example, exchanging the headrest for an outside place and the headrest for the middle place.

BRIEF DESCRIPTION OF THE DRAWINGS

The present disclosure will hereinafter be described in conjunction with the following drawing figures, wherein like numerals denote like elements.

FIG. 1 shows a device according to the present disclosure mounted in a partially depicted seat structure of a vehicle seat, in a perspective view;

FIG. 2 shows a connecting part of the device shown in FIG. 1, in a perspective view;

FIG. 3 shows a view of the arrangement according to FIG. 1 in a sectional view in the vehicle transverse direction;

FIG. 4 shows a connecting part with two bearing sections each having a recess, in a perspective view;

FIG. 5 shows an exemplary embodiment of the device with a connecting part with two bearing sections, two supporting legs and a stiffening region, in a perspective view; and FIG. 6 shows an exemplary embodiment of the device with a connecting part with two bearing sections, four supporting legs and a stiffening region, in a perspective view.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

FIG. 1 shows the device according to the present disclosure, wherein a connecting part 1 is connected to a seat structure 2 configured as a tubular seat frame. In this case, two tubular receiving elements 3 are connected to respectively one bearing section 4 of the connecting part 1, wherein in turn respectively one sleeve 5 for latching receipt of a retaining rod for a headrest is inserted in the tubular receiving elements 3. The sleeves 5 are mounted in a fixed position in the receiving elements 3.

The connecting part 1 includes both a supporting section 6 and a contact section 7. The supporting section 6 contacts the seat structure 2 in the vehicle height direction and the contact section 7 contacts the seat structure 2 in the vehicle longitudinal direction. The supporting section 6 is configured to be angled to the bearing section 4. The bearing section 4 and the supporting section 6 are configured to be substantially perpendicular to one another in the vehicle height direction. In the embodiment shown in FIG. 1, the supporting section 6 is formed by two supporting legs 8 which are spaced apart in the vehicle transverse direction.

In can be deduced from FIGS. 1 and 2 that the connecting part 1 includes a plurality of contact sections 7. One contact section 7 is formed adjacent to one supporting leg 8 and another contact section 7 is formed between the two bearing section 4. It can be seen from the diagram of the connecting part 1 in FIG. 2 that the two contact sections 7, which are formed adjacent to the supporting sections 6, particularly the supporting leg 8, are angled to the bearing section 4 and in particular are formed in the same plane as the respective supporting leg 8.

As can be deduced from FIGS. 2 and 3, the contact sections 7 adjacent to the supporting leg 8 are formed by a recess 9 of the supporting section 6, particularly a recess 9 of the supporting leg 8.

As shown in FIG. 3, the contact section 7 and the supporting section 6 abut positively against the seat structure 2. As a result, the angular position of the bearing sections 4 and thus the angular position of the receiving elements 3 relative to the seat structure 2 is fixed by the angle enclosed by the contact section 7 and supporting section 6. Furthermore, the contact sections 7 fix the distance of the bearing sections 4 and thus the receiving elements 3 for the retaining rods of the headrest in the vehicle longitudinal direction.

By a trimming change, particularly a trimming change of the recess 9 of the supporting section 6, particularly the supporting leg 8, the angular position and the spacing of the receiving elements 3 for the retaining rods of the headrest can thus be varied in a simple manner.

In the exemplary embodiment shown in FIGS. 1 and 2 as well as 3, the device and in particular the connecting part 1 is formed mirror-symmetrically. The plane of symmetry runs perpendicular to the bearing sections 4 and centrally between the two bearing sections 4.

FIG. 4 shows a connecting part which substantially differs from the connecting part 1 according to FIG. 2 in that the two bearing sections 4 each have a recess 10 for receiving a cylindrical receiving element 3. The recesses 10 on the one hand facilitate assembly since the alignment of the receiving elements 3 is fixed by the recesses 10 and on the other hand, the stability of the connection between receiving element 3 and bearing section 4 is increased.

Figures 5, 6:
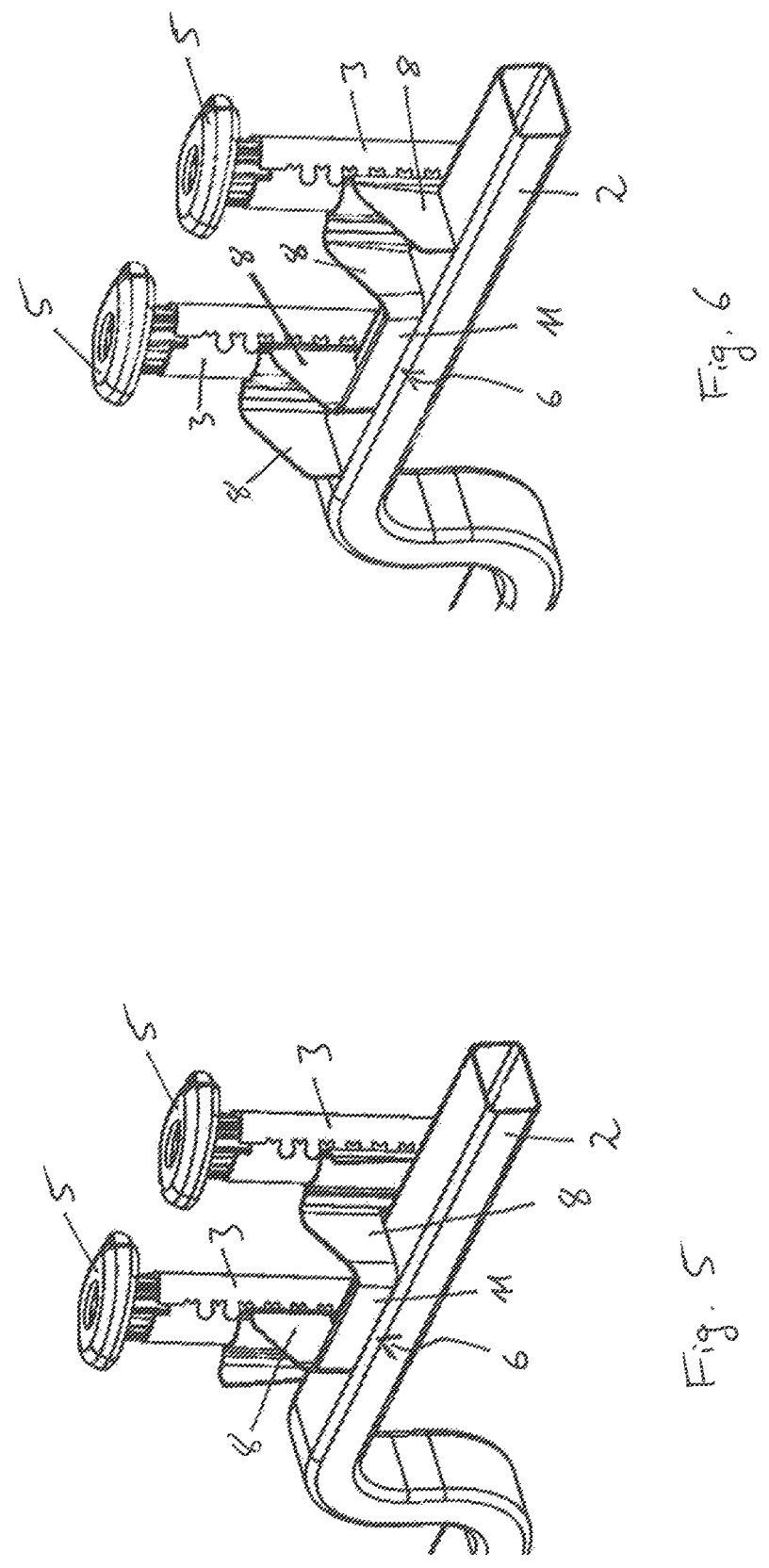

FIGS. 5 and 6 each show an exemplary embodiment of the device according to the present disclosure in a perspective view in each case.

The exemplary embodiment according to FIG. 5 shows a device with two supporting legs 8 and two bearing sections 4. In each case a tubular receiving element 3 is connected to one of the bearing sections 4. The supporting section 6 of the connecting part 1 in turn has two supporting legs 8 wherein the supporting legs 8 are formed between the two bearing sections 4. The device and in particular the connecting part 1 are configured mirror-symmetrically. The plane of symmetry runs perpendicular to the bearing sections 4 and centrally between the two bearing sections 4. The two supporting legs 8 contact the seat structure 2 in the vehicle height direction. The supporting structure 6 has a stiffening region 11 which connects the two supporting legs 8 of the supporting section 6 to one another. The stiffening region 11 is in this case formed on the sides of the supporting legs 8 facing away from the receiving element 3 and contacts the seat structure 2 in the vehicle height direction. Furthermore, in the embodiment shown two sleeves 5 are inserted in respectively one of the receiving elements 3.

The exemplary embodiment according to FIG. 6 substantially differs from the exemplary embodiment according to FIG. 5 in that the supporting section 6 has four supporting legs 8. Respectively two supporting legs 8 and one bearing section 4 form a U-shaped partial region of the connecting part 1. The two adjacent supporting legs 8 of the two U-shaped partial regions are connected to one another via a stiffening region 11. This embodiment exhibits a particularly high stability with respect to forces acting on the receiving elements 3 from outside, in particular forces acting on the connecting part 1 in the upper partial region of the receiving elements 3 in the vehicle longitudinal direction and therefore via a lever effect of the receiving elements 3.

All the embodiments of the device and the connecting parts 1 shown in the figures have a contact section 7 formed at an angle to the bearing section 4, adjacent to the supporting section 6, in particular adjacent to one of the supporting legs 8, which is formed by a recess 9 of a supporting leg 8. The contact section 7 in this case contacts the seat structure of the vehicle seat and thus fixes the spacing of the bearing sections 4 and as a result the spacing of the receiving elements 3 to the seat structure 2 in the vehicle longitudinal direction.

The embodiments of the device according to the present disclosure shown have in common that the supporting section 6 and the contact section 7 formed by a recess 9 fix the angular position of the bearing sections 4 and therefore the receiving elements 3.

The connecting part 1 is preferably connected to the seat structure 2 by a weld connection, wherein the weld connection is in particular formed in the contact region between supporting section 6 and seat structure 2 as well as contact section 7 and seat structure 2. Preferably the receiving element 3 and the bearing section 4 of the connecting part 1 are connected to one another by a weld connection.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What claimed is:

1. A device for mounting a headrest in a seat structure of a vehicle seat comprising:
   a connecting part formed from a plate; and
   a tubular receiving element for a retaining rod of the headrest; the tubular receiving element containing a sleeve for receiving the retaining rod, wherein the sleeve is mounted in a fixed position in the tubular receiving element, and wherein the sleeve includes a latching element which is configured to cooperate with a recess of the retaining rod in such a manner that receiving in the sleeve of the retaining rod not corresponding to the sleeve is prevented
   a bearing section of the connecting part connected to the receiving element;
   wherein the connecting part includes a supporting section configured at an angle to the bearing section for contacting the seat structure in a vehicle height direction.

2. The device according to claim 1, wherein the connecting part comprises a contact section which contacts the seat structure in a vehicle longitudinal direction.

3. The device according to claim 2, wherein the contact section and the bearing section are configured at an angle to one another.

4. The device according to claim 3, wherein the contact section comprises a recess formed in the supporting section.

5. The device according to claim 2, wherein the contact section and the supporting section are angled with respect to each other at an angle of between 60° and 105° in a the vehicle transverse direction.

6. The device according to claim 2, wherein at least a partial region of the seat structure positively abuts against the contact section and against the supporting section.

7. The device according to claim 1, wherein the bearing section has a recess corresponding to the shape of the receiving element on the side facing the receiving element.

8. The device according to claim 1, wherein the connecting part is formed in one piece.

9. The device according to claim 1, wherein the connecting part is formed of metal.

10. The device according to claim 1, wherein the connecting part comprises two bearing sections.

11. The device according to claim 1, wherein the supporting section comprises at least one supporting leg.

12. The device according to claim 11, wherein the supporting section comprises a stiffening region connecting two supporting legs to one another.

13. The device according to claim 12, wherein two supporting legs and the bearing section form a U-shaped angled partial region of the connecting part.

14. The device according to claim 1, wherein the connecting part is connected to the receiving element by a weld connection.

15. The device according to claim 1, wherein the connecting part is connected to the seat structure by a weld connection.

* * * * *